United States Patent [19]

Box, Jr.

[11] Patent Number: 4,814,939

[45] Date of Patent: Mar. 21, 1989

[54] CAPACITOR WITH INTEGRAL TAB ARBOR

[75] Inventor: Benton H. Box, Jr., Columbia, S.C.

[73] Assignee: North American Philips Corporation, New York, N.Y.

[21] Appl. No.: 140,016

[22] Filed: Dec. 31, 1987

[51] Int. Cl.[4] .......................... H01G 1/14; H01G 7/00
[52] U.S. Cl. ..................................... 361/307; 29/25.42
[58] Field of Search ............... 29/25.42; 361/306, 307, 361/433 W

[56] References Cited

U.S. PATENT DOCUMENTS

| | | | |
|---|---|---|---|
| 1,960,944 | 5/1934 | Knudsen | 361/307 |
| 3,058,040 | 10/1962 | Wellington | 361/433 |
| 3,163,917 | 1/1965 | Bilsing et al. | 29/25.42 |
| 3,175,137 | 3/1965 | Huber | 29/25.42 X |
| 3,229,174 | 1/1966 | Marchewka | 361/307 |
| 3,270,254 | 8/1966 | Cohn | 361/433 |
| 3,339,252 | 9/1967 | Banks | 29/25.42 |
| 3,471,098 | 10/1969 | Jannett | 242/56.1 |
| 3,654,524 | 4/1972 | Puppolo et al. | 361/433 |
| 4,166,285 | 8/1979 | Bauer et al. | 29/25.42 |
| 4,719,539 | 1/1988 | Lavene | 361/307 |

FOREIGN PATENT DOCUMENTS 1439346  11/1971  Fed. Rep. of Germany .

Primary Examiner—Donald A. Griffin
Attorney, Agent, or Firm—Robert J. Kraus

[57] ABSTRACT

Capacitor layers are wound around a tab arbor which remains in the completed winding. The tab arbor includes first and second conductive portions which are electrically insulated from each other. First and second conductive layers in the winding, forming the electrodes of the capacitor, are electrically connected to the respective conductive portions of the tab arbor. These conductive portions serve both as means for making low impedance electrical connections to the capacitor and as means for mounting the winding.

14 Claims, 4 Drawing Sheets

CAPACITOR WITH INTEGRAL TAB ARBOR

BACKGROUND OF THE INVENTION

1. Field of the Invention

The invention relates to wound capacitors, and in particular to capacitors having alternating conductive and separating layers wound around a central core device, such as a mandrel.

2. Description of the Prior Art

Wound capacitors exist in many forms including electrolytic, paper and thin film capacitors, In an effort to keep the Equivalent Series Resistance (ESR) and the Effective Series Inductance (ESL) at a minimum, it is known to wind the capacitor layers in an extended-foil configuration. For example, see FLAT-PACK ELECTROLYTIC CAPACITORS FOR SWITCHED-MODE POWER SUPPLIES by Warren J. Clement, IEEE, pages 105–110 (1983). In the extended-foil configuration disclosed in this article, where the anode and cathode electrode layers extend beyond the dielectric layers of the capacitor winding, adjacent windings of each of these extended portions of the layers are pressed together to form a continuous electrical connection to the respective electrode along its length. This continuous connection significantly reduces both the ESR and the ESL from values achieved by a typical prior art connection means employing a plurality of conductive tabs attached to the electrode at intervals along its length. Unfortunately, the article does not disclose any specific conductive structures for making low-resistance and low-inductance electrical connections to the extended electrode portions. Such conductive structures must not only be configured to maintain the low ESR and low ESL (hereinafter referred to as low impedance) achieved by the continuous extended foil connections, but also must be chemically compatible with the electrode material and any electrolyte which might be used in the capacitor.

Although many patents are known for wound capacitors having low ESR and low ESL values, the means for making electrical connections to the electrodes of these capacitors tend to be complicated (and thus expensive to manufacture) or rely on thin foil strips having a relatively large resistance per unit length for making the connections. See for example U.S. Pat. Nos. 3518500, 3611051, 3654524, 3822397, and 4385342.

SUMMARY OF THE INVENTION

It is an object of the invention to provide a wound capacitor which integrally includes a simple conductive structure for making low ESR and low ESL electrical connections to the electrodes of the capacitor. In accordance with the invention, a "tab arbor" around which the capacitor layers are wound is retained in the capacitor as the integral conductive structure. The tab arbor includes first and second conductive portions, which are electrically insulated from each other, for making electrical connections to the capacitor. The winding of the capacitor includes first and second conductive layers having portions thereof in contact with the first and second conductive portions, respectively, of the tab arbor. The winding also includes first and second separating layers for physically separating the conductive layers. These separating layers may be insulating layers (such as the dielectric layers in a paper-foil or metallized film capacitor) or electrolyte-containing layers (such as are used in electrolytic capacitors). The first and second conductive layers have respective portions extending from the wound separating layers along substantially the entire lengths of the layers.

The mass of the integral tab arbor not only provides low-impedance electrical connections to the capacitor windings, but also facilitates mounting of the capacitor within a housing and/or attachment of the capacitor to a circuit in which it is used. For example, in one preferred embodiment, ends of the tab arbor extend through slots in opposite sides of a housing and are bent into shapes which can be easily attached to a bus bar or a circuit board.

DESCRIPTION OF THE PREFERRED EMBODIMENTS

Figure 1A:
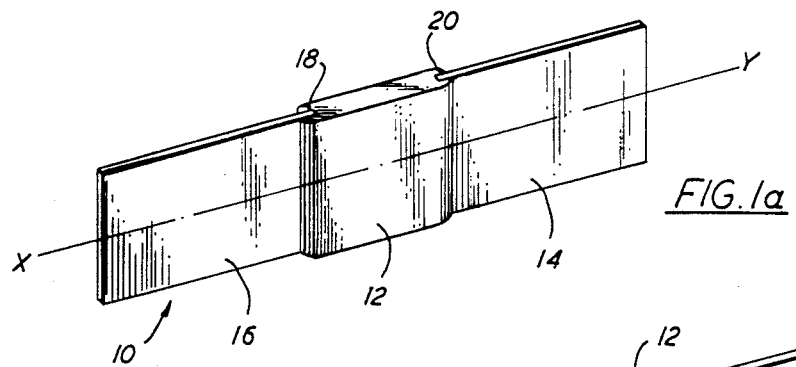
FIGS. 1a through 1c are perspective drawings illustrating steps in making a first embodiment of a capacitor winding in accordance with the invention.

Manufacture of a first embodiment of the invention begins with the formation of a tab arbor as is shown in FIG. 1a. The tab arbor 10 includes a central insulating portion 12 and first and second conductive end portions 14 and 16. The central portion is a flat member formed of a plastic such as polyethylene and has slots 18, 20 formed in edges at opposite ends. The end portions are flat members formed of a metal such as aluminum or tantalum. This metal preferably corresponds with the material used for the electrodes of the capacitor winding. Edges of the end portions are inserted in respective ones of the slots 18, 20 and secured by a press fit. Typically the metal end members 14, 16 are one-sixteenth inch thick and the plastic central member 12 is three-sixteenths inch thick.

In an alternative configuration, the tab arbor could be formed from a single piece of plastic or other insulating material which is coated at the end portions 14, 16 with a conductive material.

Figure 1B:
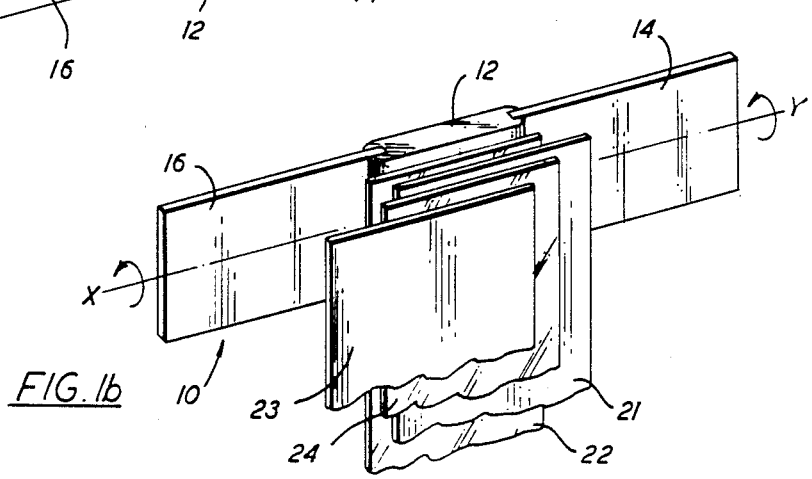

FIG. 1b illustrates the arrangement of the capacitor layers prior to winding the layers around the tab arbor. The layers include a first conductive layer 21 disposed on a first separating layer 22, and a second conductive layer 23 disposed on a second separating layer 24. The layers are held on the tab arbor by the tension of subsequent windings.

Depending on the type of capacitor made, the separating layers perform different functions. For example, in a paper-foil capacitor both of layers 22 and 24 are insulating layers. After winding, layer 22 serves to electrically insulate the bottom side of conductive layer 21 from the top side of conductive layer 23, and layer 24 serves to electrically insulate the top side of conductive layer 21 from the bottom side of conductive layer 23. In an electrolytic capacitor the separating layers 22, 24 are layers of paper or other porous material saturated with electrolyte, as is well known in the art; the conductive layers are electrically insulated from each other by oxide coatings on their surfaces.

Figure 1C:
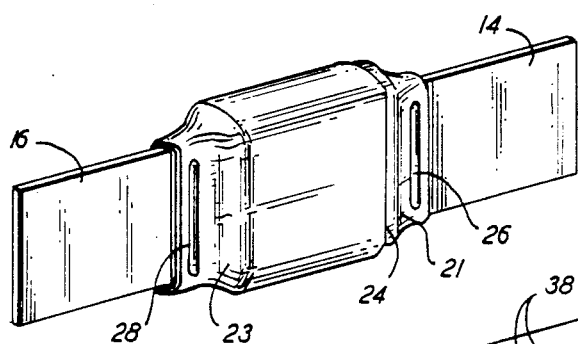

As is shown in FIG. 1b, the separating layers 22, 24 extend axially across the central insulating portion 12 of the tab arbor, while the conductive layers 21, 23 axially extend beyond the separating layers onto respective end portions 14, 16 of the tab arbor. When the capacitor winding is formed, by rotating the tab arbor 10 around the axis x-y in the direction indicated by the arrows, the extended portions of the conductive layers 21, 23 each form a continuous electrical contact. Each of these extended portions first wraps around a respective end portion of the tab arbor, and then wraps around itself. In the completed winding, shown in FIG. 1c, the extended portions of the conductive layers 21, 23 are cold welded at locations 26, 28, respectively, to ensure that permanent low-impedance electrical connections are formed through the layers and to the conductive ends 14, 16 of the tab arbor.

If the separating layers are to be impregnated with electrolyte, such impregnation may be done either during winding or just prior to the cold welding step. The welding step itself may be done by, for example, resistance welding, TIG welding (tungsten inert gas), heli-arc welding, cold welding, or ultrasonic welding. The resulting capacitor winding is a compact and durable unit with integral low-impedance conductive connections to the capacitor electrodes formed by the conductive ends 14, 16 of the tab arbor.

Figure 2:
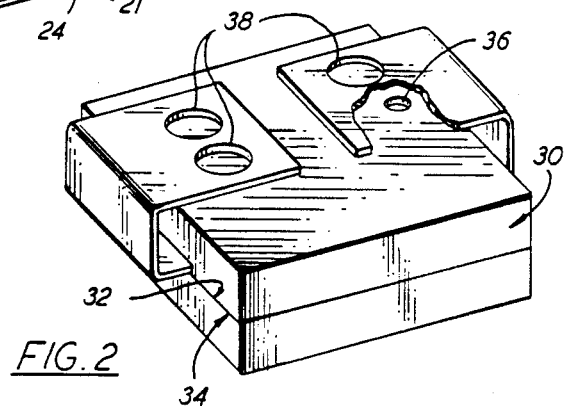
FIG. 2 is a perspective drawing illustrating one means for packaging the first embodiment.

The capacitor winding configuration also simplifies packaging and electrical and mechanical connection of the finished capacitor to circuitry in which it is to be used. For example, as is illustrated in FIG. 2, the winding may be secured in a two-piece plastic container 30 with the conductive end portions 14, 16 extending through respective slots formed between mating edges 32, 34 of the container. The container is sealed and the winding secured in place by cold welding or adhesively fixing the opposing edges to each other and to the conductive end portions. If internal gases will be produced in the container, which commonly occurs in electrolytic capacitors, a pressure-relief port 36 is provided in the container as is well known in the art.

The conductive end portions themselves are each bent in a U-shaped configuration with their ends approaching each other. This configuration facilitates both the mechanical and electrical connection of the capacitor. For example, with the capacitor oriented as shown in FIG. 2, the conductive end portions serve as terminals for connecting the capacitor to the bottoms of positive-polarity and negative-polarity bus bars. Attachment is achieved by utilizing screws which are passed through holes 38 in each of the terminals and threaded into corresponding holes in a respective one of the bus bars. Alternatively, the capacitor can be inverted such that the terminals 14, 16 are below the container, and the terminals can be soldered to a circuit board.

FIGS. 3a–3d illustrate a layer arrangement and winding procedure for a second embodiment of the invention in which a tab arbor comprising two discrete conductive parts is used. Such a tab arbor is easier to produce than the single-piece tab arbor 10 (see FIG. 1a), but slightly complicates the winding process.

Figure 3A:
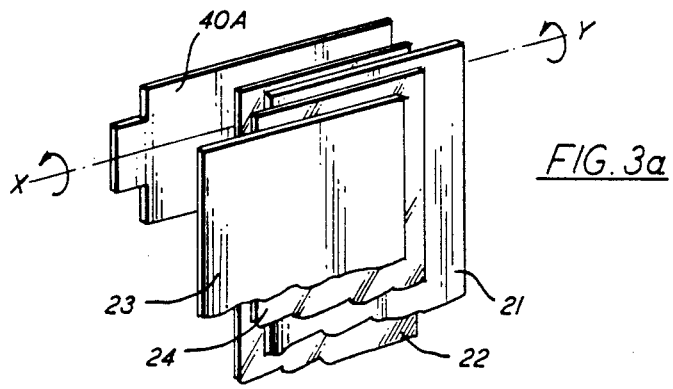
FIGS. 3a through 3d are perspective drawings illustrating steps in making a second embodiment of a capacitor winding in accordance with the invention.

Manufacture of the second embodiment begins as shown in FIG. 3a with the arrangement of the conductive layers 21, 23 and the separating layers 22, 24 on the first part 40A of the tab arbor. The arrangement and materials of the layers is substantially identical to that of FIG. 1b, with the conductive layers 21, 23 again axially extending beyond the separating layers 22, 24. However, only the extension of conductive layer 23 contacts a part (40A) of the tab arbor at this stage of manufacture.

Figure 3B:
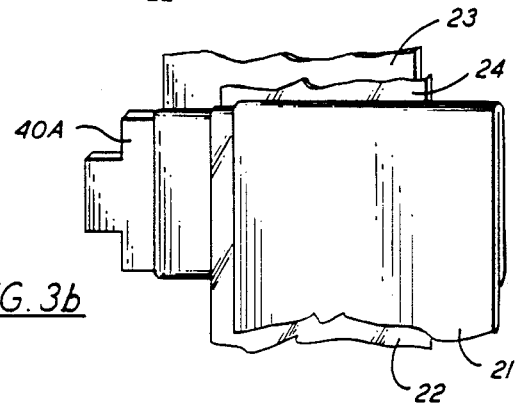
Figure 3C:
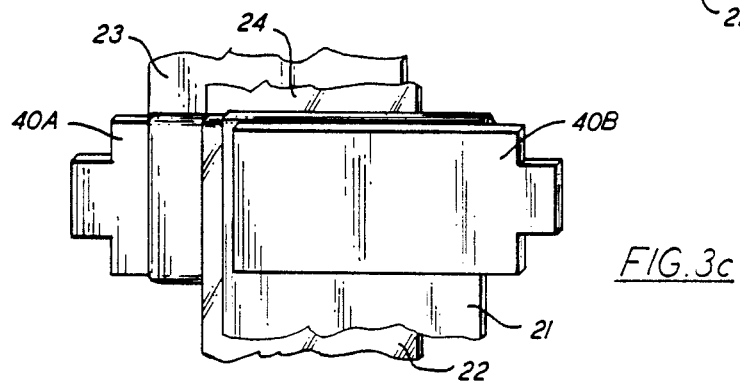
Figure 3D:
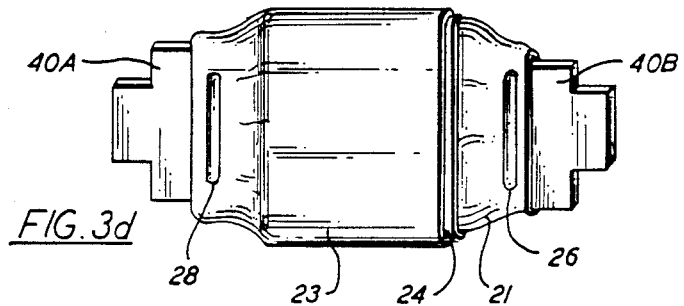

With the layers attached thereto, part 40A of the tab arbor is rotated around central axis x-y, in the direction indicated by the arrows, until the layers are wound around the part at least one time. Then, as shown in FIG. 3b, layers 23 and 24 are temporarily spaced from layers 21 and 22. Subsequently, as shown in FIG. 3c, the second part 40B of the tab arbor is placed on layer 21 and winding is continued until the completed winding shown in FIG. 3d is produced. Parts 40A and 40B are electrically insulated from each other by the layers themselves, or by oxide coatings in the case of an electrolytic capacitor.

In the completed winding the extended portions of the conductive layers 21, 23, respectively, form continuous electrical contacts with the parts 40B and 40A. The extended portions are cold welded at locations 26, 28 as described in conjunction with FIG. 1c.

Figure 3E:
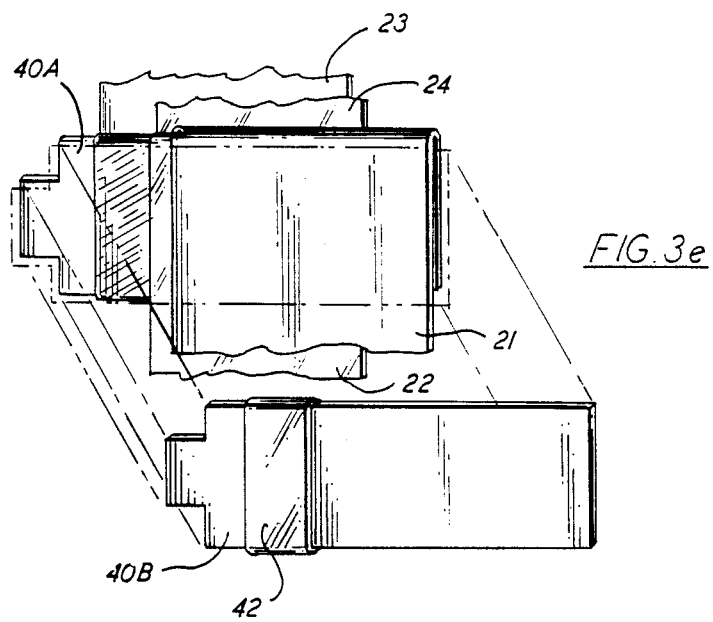
FIGS. 3e through 3f are perspective drawings illustrating steps in making a third embodiment of a capacitor winding in accordance with the invention.
Figure 3F:
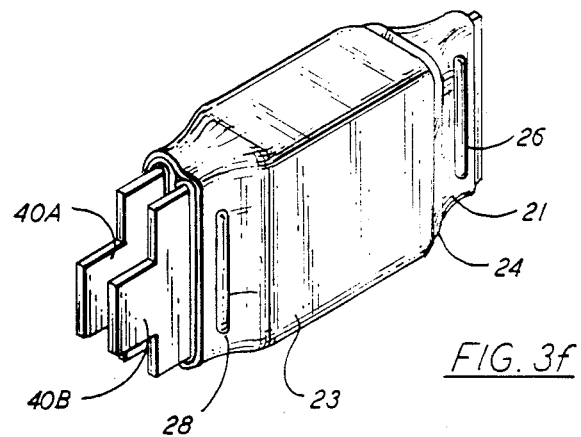

FIGS. 3e and 3f illustrate alternatives to the manufacturing steps illustrated in FIGS. 3c and 3d, respectively. As can be seen from FIG. 3e, the part 40B of the tab arbor is positioned on conductive layer 21 such that it will protrude from the same end of the completed winding as part 40A. This necessitates the addition of a band 42 of insulating material, such as (MYLAR) plastic film wrapped around that portion of conductive part 40B which lies adjacent the extended portion of conductive layer 23. In the completed winding, shown in FIG. 3f, cold welds 26 and 28 may again be formed provided that weld 28 is produced over the region of the insulating band 42.

Packaging of the FIG. 3d form of the second embodiment can be simply achieved by utilizing a container similar to that shown in FIG. 2. For the FIG. 3f embodiment, a container having a slot sufficiently wide to pass the spaced-apart ends of both of parts 40A and 40B could be provided. This slot would be sealed by an epoxy or potting compound, depending on the chemistry of the capacitor winding.

Figure 4A:
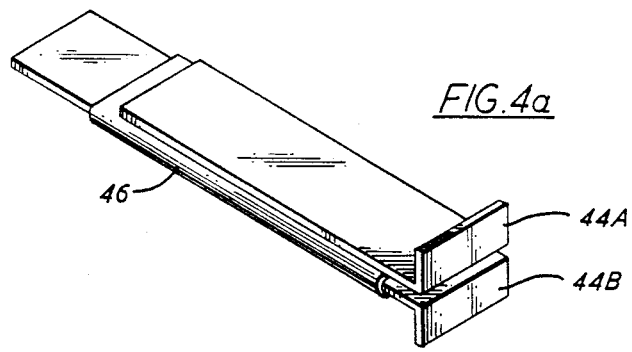
FIGS. 4a through 4c are perspective drawings illustrating steps in making a fourth embodiment of a capacitor winding in accordance with the invention.
Figure 4B:
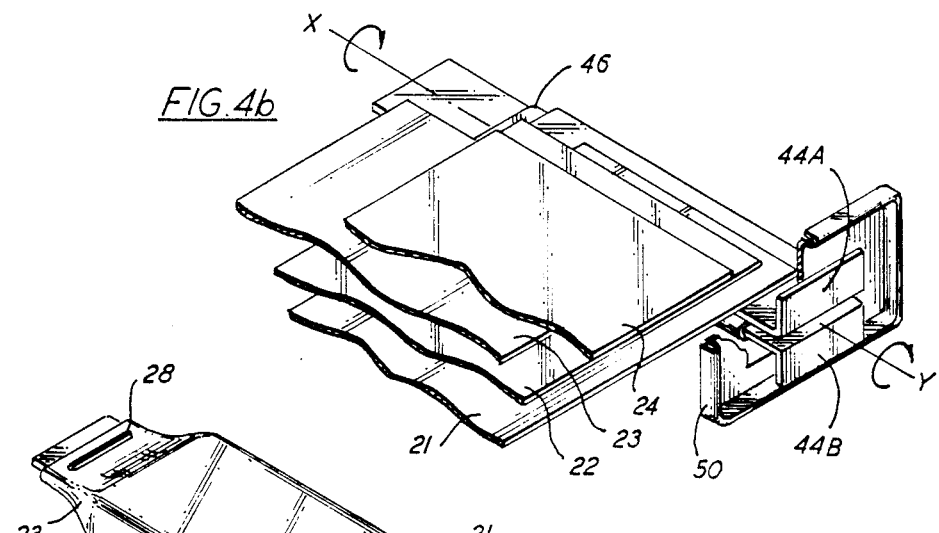
Figure 4C:
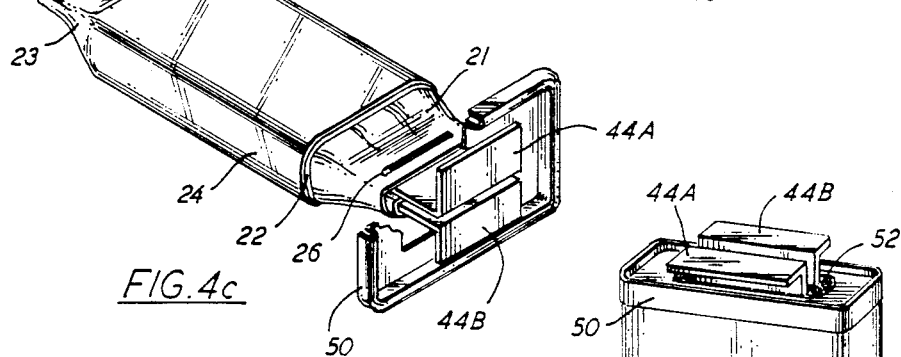

FIGS. 4a–4c illustrate a layer arrangement and winding procedure for a third embodiment of the invention in which a tab arbor comprising two L-shaped conductive parts is used. In this embodiment the tab arbor manufacture is simplified (over that of FIG. 1a) without complicating the winding process.

Manufacture of the third embodiment begins as shown in FIG. 4a with the two L-shaped conductive parts 44A, 44B spaced apart and electrically insulated by an insulating sleeve 46 which has been slipped over a longer one (44B) of the parts. This sleeve is preferably made of a plastic material such as (MYLAR) plastic film. The layers are then attached as shown in FIG. 4b. The arrangement and materials of the layers are again substantially identical to that of FIG. 1b, except that the stacking orders of the conductive layers 21, 23 and the separating layers 22, 24 is reversed, with the bottom layer being the conductive layer 21. When the capacitor winding is formed by winding the tab arbor around the axis x-y in the direction indicated by the arrows, the extended portions of the conductive layers 21, 23 respectively form continuous electrical contacts with the parts 44A and 44B. In the completed winding, shown in FIG. 4c, cold welds 26 and 28 are produced as in the first embodiment.

Figure 4D:
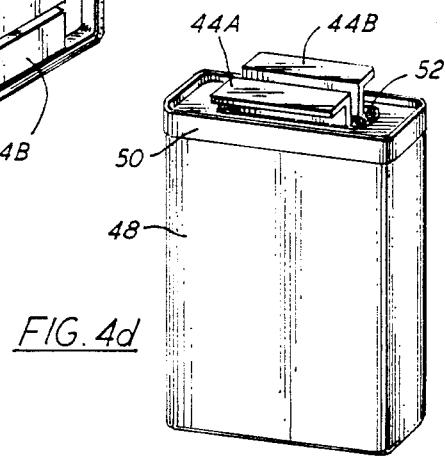
FIG. 4d is a perspective drawing illustrating one means for packaging the fourth embodiment.

FIG. 4d illustrates one form of container which is suitable for packaging the winding shown in FIG. 4c. The container comprises a box 48 closed by a lid 50, each preferably consisting of a plastic material such as phenolic. The lid includes a slot 52 which is sufficiently wide to allow the ends of the tab arbor parts 44A, 44B to extend therethrough. The slot is sealed by a material 52 such as epoxy. The lid itself is preferably secured to the box 48 by ultrasonic or solvent welding for a plastic box, or by a lip-rolling technique for an aluminum box. The lid must be slipped over the tab arbor before attachment of the layers as is illustrated in in FIGS. 4b and 4c.

Although certain exemplary embodiments of the invention have been described, many alternatives are possible within the scope of the appended claims. For example, the capacitor winding need not be packaged in a container, but can be packaged by encapsulation or by merely wrapping a band around the layers to hold them in place. Also, the ends of the tab arbor may extend through different parts of a container than shown, or may remain entirely within the container. In the latter case, electrical contact to the tab arbor ends can be made by conductive pins or tabs extending through the container walls.

I claim:

1. A wound capacitor comprising:
   a. a tab arbor including first and second flat conductive portions which are electrically insulated from each other, said conductive portions having lateral extensions serving as means for making low impedance electrical connections to the capacitor;
   b. a first conductive layer having first and second sides, said layer being tension wound around the tab arbor for retaining said layer on said arbor with a substantial portion of one of said sides in low impedance electrical contact with the first conductive part;
   c. a second conductive layer having first and second sides, said layer being similarly tension wound around the tab arbor with a substantial portion of one of said sides in low impedance electrical contact with the second conductive portion;
   d. a first separating layer tension wound around the tab arbor and disposed between the first side of the first conductive layer and the second side of the second conductive layer to physically separate said sides from each other;
   e. a second separating layer tension wound around the tab arbor and disposed between the first side of the second conductive layer and the second side of the first conductive layer to physically separate said sides from each other;
   said first conductive layer having a portion extending from the wound separating layers along substantially the entire length of said conductive layer, adjacent windings of said portion being in substantially continuous low impedance contact with each other, said extending portion being welded to said first flat conductive portion to form a low impedance connection;
   said second conductive layer having a portion extending from the wound separating layers along substantially the entire length of said conductive layer, adjacent windings of said portion being in substantially continuous low impedance contact with each other, said extending portion being welded to said second flat conductive portion to form a low impedance connection; and
   f. packaging means containing said wound layers.

2. A wound capacitor as in claim 1 where the first and second conductive portions comprise discrete conductive members of the same material as said conductive layers, and where said conductive members are separated by a discrete insulating member.

3. A wound capacitor as in claim 2 where the conductive members are attached to the insulating member.

4. A wound capacitor as in claim 2 where each of the conductive and insulating members is a separate part.

5. A wound capacitor as in claim 4 where the insulating member comprises one of the separating layers wound around the tab arbor.

6. A wound capacitor as in claim 4 where the insulating member comprises an insulating layer surrounding a predefined length of one of the conductive members.

7. A wound capacitor as in claim 2 where the first and second conductive portions are at opposite ends of the tab arbor.

8. A wound capacitor as in claim 2 where the first and second conductive portions are at a same end of the tab arbor.

9. A wound capacitor comprising:
   a. a tab arbor including, arranged along a central longitudinal axis thereof, first and second flat conductive parts separated by an insulating part which electrically insulates said conductive parts from each other, said conductive parts serving as means for making low impedance electrical connections to the capacitor;
   b. a plurality of layers of material tension wound together around the tab arbor in a direction circling the axis, said layers including, in order:
      (1) a first separating layer extending axially across the insulating part;
      (2) a first conductive layer extending axially across the first separating layer and the first conductive part;
      (3) a second separating layer extending axially across the insulating part;
      (4) a second conductive layer extending axially across the second separating layer and the second conductive part;
      said first conductive layer having a portion extending from the wound separating layers along substantially the entire length of said conductive layer, adjacent windings of said portion being in substantially continuous low impedance contact with each other, said extending portion being welded to said flat conductive portion to form a low impedance connection;
      said second conductive layer having a portion extending from the wound separating layers along substantially the entire length of said conductive layer, adjacent windings of said portion being in substantially continuous low impedance contact with each other, said extending portion being welded to said flat conductive portion to form a low impedance connection; and
   f. packaging means containing said wound layers.

10. A wound capacitor as in claim 9 where the packaging means comprises a housing from which respective ends of the conductive parts protrude, said protruding parts serving as electrical terminals of the capacitor.

11. A wound capacitor as in claim 1 or 9 where said capacitor is an electrolytic capacitor.

12. A wound capacitor as in claim 1 or 9 where said capacitor is a metallized film capacitor.

13. A wound capacitor as in claim 1 or 9 where said capacitor is a paper foil capacitor.

14. A wound capacitor as in claim 9 wherein said first and second conductive parts and said first and second conductive layers are formed of the same conductive material.

* * * * *